J. T. WILSON.
CAR-COUPLINGS.
No. 194,542. Patented Aug. 28, 1877.
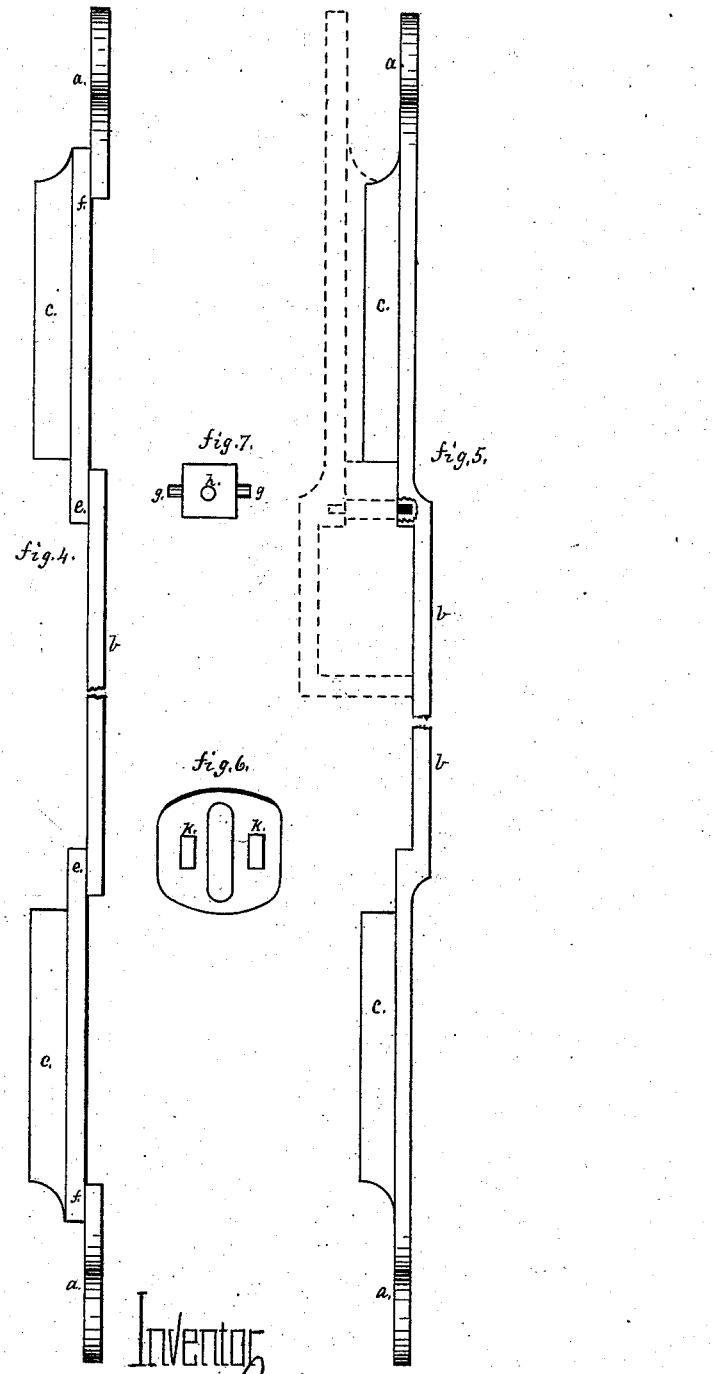

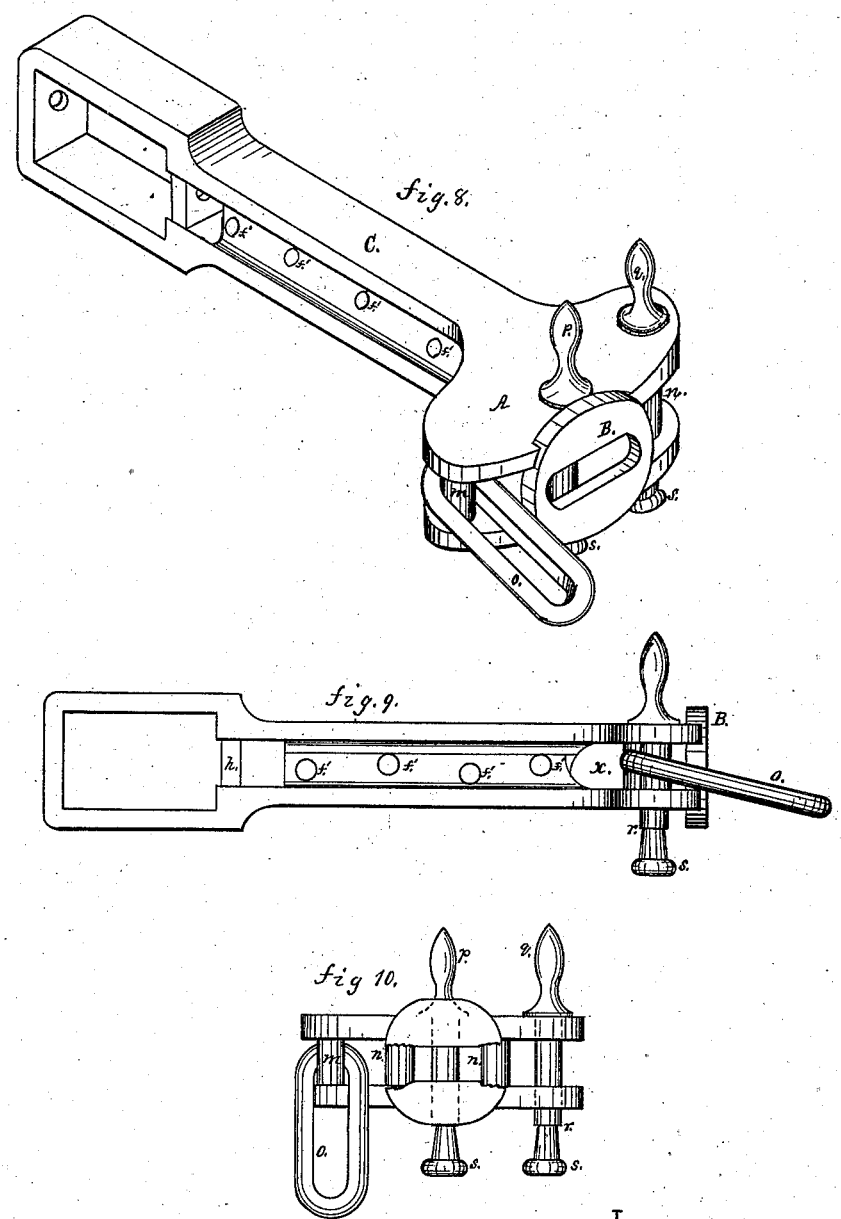

UNITED STATES PATENT OFFICE.

JOHN T. WILSON, OF PITTSBURG, PENNSYLVANIA, ASSIGNOR TO WILSON, WALKER & CO., OF SAME PLACE.

IMPROVEMENT IN CAR-COUPLINGS.

Specification forming part of Letters Patent No. 194,542, dated August 28, 1877; application filed October 26, 1876.

*To all whom it may concern:*

Be it known that I, JOHN T. WILSON, of Pittsburg, in the county of Allegheny and State of Pennsylvania, have invented a new and useful Improvement in Car-Couplings, Buffers, and Draw-Bars; and I do hereby declare that the following is a full and exact description thereof, reference being had to the accompanying drawings, and to the letters of reference marked thereon.

My invention relates to an improvement in coupling, buffers, and draw-bars, and consists in the peculiar construction of the same.

To enable others skilled in the art to make and use my invention I will proceed to describe its construction.

In the accompanying drawings, which form part of my specification, Figure 1 represents a pile for forming a front portion of the buffer-head. Fig. 2 represents the same after being forged. Fig. 3 represents the piece cut from the plate represented in Fig. 2. Fig. 4 represents the manner of arranging the several parts together for the purpose of welding them. Fig. 5 shows the parts represented in Fig. 4, after being forged, bent into the desired form. Fig. 6 is the face-plate of the buffer-head. Fig. 7 is a swivel for the coupling or spring-bolt. Fig. 8 is a perspective view of the buffer-head and draw-bar when finished. Fig. 9 is a side view of the same. Fig. 10 is a front view of the same, representing a portion of the buffer-plate broken away.

An essential feature in the construction of my improvement in buffer-head and draw-bar of the class herein described is in so arranging the iron that its fiber will be on a line with the draft of the buffer-head and draw-bar.

To this end I form a "pile" of three pieces, as represented in Fig. 1, which is heated and forged into the form represented in Fig. 2. Then, by means of a suitable set of dies, I cut from the plate represented in Fig. 2 a piece such as is represented in Fig. 3 and marked $a$. I then take a flat bar of iron of the desired thickness and width, as at $b$, and pieces of T-shaped iron, $c$, and unite the flat bar and T-shaped iron at $e$ by the welding process, and also unite the piece represented in Fig. 3, and marked $a$, to the T-shaped iron at $f$ by the welding process, and then form openings for the trunnions $g$ of the swivel $h$, (shown in Fig. 7,) after which it is heated and bent into the form represented in Fig. 5, with the swivel $h$ in its proper place, as indicated by the dotted lines in Fig. 5. The parts $c$ are then drilled through and riveted together, as indicated in Figs. 8 and 9 at $f'$. The face-plate of the buffer-head is then placed on the front end of the buffer-head A, the tongues $j$ entering the openings $k$ in the face-plate of the buffer-head, and are riveted, thereby securing the face-plate firmly in the recesses $l$ of the buffer-head, which recesses are clearly shown in the piece marked $a$, shown in Fig. 3.

In the space $x$ of the buffer-head are riveted two stays, $n$, and a fixed draw-pin, $m$, which passes through a coupling-link, $o$. The stays $n$, being firmly riveted in the draw-head A, give great strength and firmness to it.

The buffer-head is furnished with two coupling-pins, $p$ and $q$, having shoulders at $r$, and an enlarged end, $s$, which prevents the pin from being drawn out of the draw-head, the shoulders $r$ of the coupling-pins enabling the operator to set the pins in the upper portion of the draw-head prior to coupling.

By constructing the buffer-head and draw-bars as hereinbefore described, great strength is secured. Two and three coupling-links may be used, or a single central link may be used, or two side-draft links.

The curvature of the front end of the buffer-head is made to correspond to the variations from a straight line of draft of the cars, as when passing around curves of railways, and to correspond to the motion of the cars on the track, and is adapted to short coupling, which is now generally practiced in the coupling of cars together.

Having thus described the nature and construction of my improvement, what I claim as of my invention is—

1. In a car-coupling, the parts A, B, C, $b$, and $h$, constructed as hereinbefore described, and united together in the manner set forth, for the purpose of forming a coupling such as represented in Figs. 8 and 9, substantially as described.

2. In a car-coupling, the parts A, provided with stays $n\ n$ and draw-pin $m$, whereby said parts are stiffened and braced, substantially as described.

JOHN T. WILSON.

Witnesses:
A. C. JOHNSTON,
JAMES J. JOHNSTON.